Figure 1:
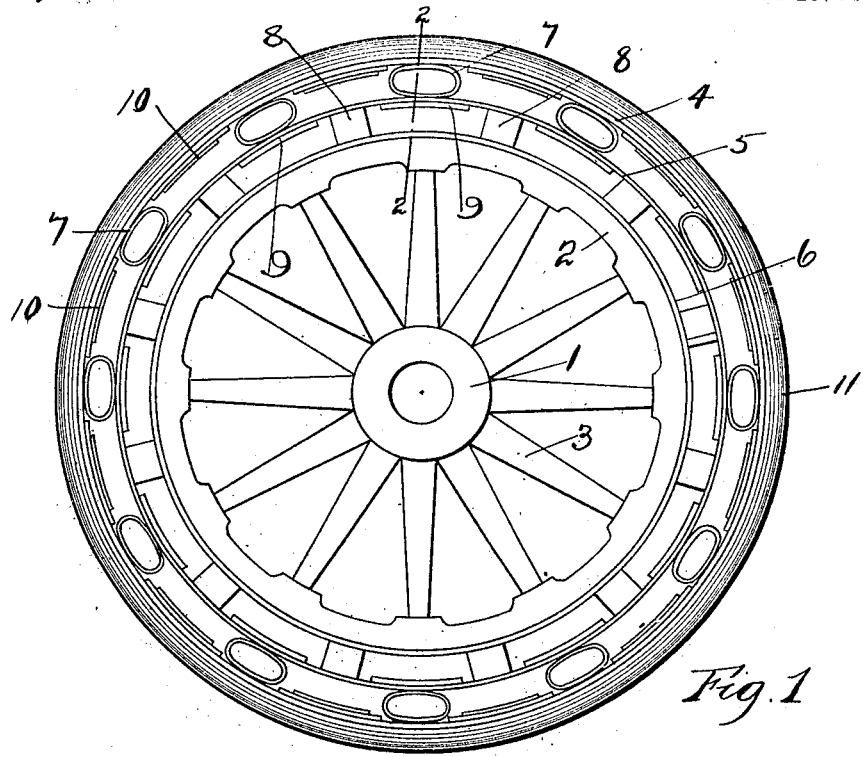

E. KNOWLES.
TIRE OF VEHICLES.
APPLICATION FILED JUNE 24, 1907.

910,134.

Patented Jan. 19, 1909.

Witnesses
Robert E. Lanphear
E. D. Ogden

Inventor
Edwin Knowles.
By Howard E. Barlow
Attorney

UNITED STATES PATENT OFFICE.

EDWIN KNOWLES, OF PROVIDENCE, RHODE ISLAND.

TIRE OF VEHICLES.

No. 910,134.　　　　Specification of Letters Patent.　　　Patented Jan. 19, 1909.

Application filed June 24, 1907.　Serial No. 380,441.

*To all whom it may concern:*

Be it known that I, EDWIN KNOWLES, a citizen of the United States, residing at the city of Providence, in the county of Providence and State of Rhode Island, have invented certain new and useful Improvements in Tires for Vehicles, of which the following is a specification, reference being had therein to the accompanying drawing.
This invention relates to tires for vehicle wheels and has for its object to provide a resilient tire that will be flexible and yielding in its action while running on the road and possess practically all of the desirable effects and advantages of a pneumatic tire without the extreme disadvantage of being so easily injured and destroyed.

Automobilists and others are only too well aware of the extreme unreliability of pneumatic tires owing to their rapid deterioration, blowouts, punctures, etc., all of which faults and troubles my present invention is designed to fully overcome, and provide in its place a flexible tire that will give the desired resiliency and at the same time withstand the wear and tear a tire of this nature is subjected to.

In carrying out my invention I have provided a tire having a single resilient band constructed of a continuous rim of wood, fiber, steel, or other suitable material, said band being supported at intervals by auxiliary springs or other suitable supporting means.
Another feature of my invention is that in addition to the said single outer ring I have also provided a second continuous band within the first which inner band is designed to support the outer band through suitable spring blocks, or other suitable supports, the inner band being supported from the rim of the wheel. I do not, however, confine myself to the use of a single resilient outer ring or tire any desired number of such spaced apart concentric bands may be used one within the other without departing from the spirit and scope of my invention.

The invention is fully set forth in this specification and more particularly pointed out in the appended claims.

Figure 3:
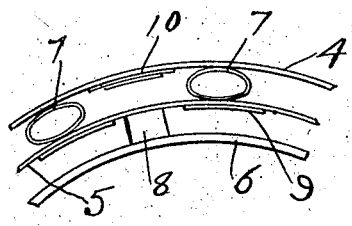
Figure 2:
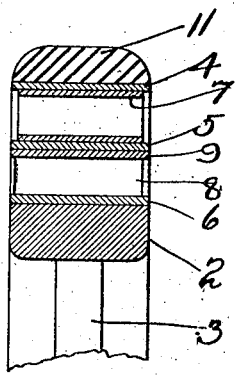

In the accompanying drawings: Figure 1— is a side elevation of a vehicle wheel on which is mounted my improved resilient tire. Fig. 2—is a sectional elevation through the rim of the same on line 2—2 of Fig. 1. Fig. 3—is a detail showing a small section of the concentric resilient rings and the supporting blocks of which the tire is constructed.

Referring to the drawings at 1 is the hub of the wheel and 2 the inner rim thereof, which is supported from said hub by a plurality of spokes 3. This portion of the wheel may be constructed in any convenient or desirable manner, said inner rim 2 being sufficiently heavy to support the load without yielding.

My invention consists essentially of a resilient band or tire 4 which may be constructed of wood, fiber, or any other suitable material, but I preferably construct the same of spring or resilient metal which is designed to give and yield as it rolls along the road, to absorb the shock and jars at the initial point of impact. Within this outer band is shown a second ring or band 5 spaced apart from the said outer ring and concentric therewith. This ring like the outer ring is also made of a resilient or flexible material, preferably of spring steel. Within this second ring is also shown a third ring 6 spaced apart and concentric therewith. This inner ring may be of flexible material, if desired, but it is not necessary as said ring is not called upon to perform the function of the first two rings, as it fits closely on and is secured to the inner rim 2 of the wheel. This outer resilient band or ring 4 is shown as being supported on the inner resilient ring 5 by means of the auxiliary springs 7—7, but as the second ring is also of flexible material yielding blocks of rubber, or the like, or even solid blocks, may be inserted in place thereof and yet produce substantially the same effect. The same is true of the blocks 8—8 which are inserted between the inner ring 6 and the resilient ring 5. These blocks may be of any yielding or non-yielding material or they may be of springs if desired, and placed as close together as is found necessary in the practical construction and operation of the wheel.

In the drawing I have shown the supporting blocks and springs 7 and 8 disposed alternately and at close intervals around the tire, but I do not confine myself to this arrangement of supports as the blocks and springs may be arranged as close together as desired to best support the same.

Another feature of my invention is that the inner resilient ring 5 is shown as being supported by a flat reinforcing spring 9 beneath the point where they support the outer ring through the spring 7, but any kind of a supporting spring or yielding material may be employed at these points to reinforce or support both the inner and outer rings if desired. As a further support for the outer resilient ring I have shown the flat or leaf spring 10 secured to the inside of said outer ring between its spring supports 7—7, but any other desired means may be provided for stiffening or supporting the rim at these points between the said supports 7—7.

In practice the outer resilient metal rim 4 may come in direct contact with the road, if desired, but I have herein shown an outer covering or shoe 11 which may be constructed of wood, fiber, or any other suitable material but rubber is preferably employed to receive the initial shock and so protect to some extent the metal rim if desired.

My invention is of a comparatively simple and practical construction and is very efficient in its operation.

Having thus described my invention, what I claim as new and desire to secure by Letters Patent, is:

An improvement in tires comprising an inner rigid rim, a second resilient rim encircling the same, blocks interposed between said rims, reinforcing strips for said resilient rim located between said blocks, an outer resilient rim encircling said second rim, elliptical springs interposed between said outer and said second rims and bearing against the reinforcing portions of said second rim, said springs and blocks being in staggered relation, resilient reinforcing strips for the outer rim interposed between said springs, and an elastic body secured to the exterior of said outer rim.

In testimony whereof I affix my signature in presence of two witnesses.

EDWIN KNOWLES.

Witnesses:
HOWARD E. BARLOW,
E. I. OGDEN.